Jan. 18, 1966  F. H. S. ROSSIRE  3,229,511
STRESS SENSOR AND CONTROL SYSTEM FOR LIMITING
STRESSES APPLIED TO AIRCRAFT
Original Filed June 19, 1961   3 Sheets-Sheet 1

INVENTOR.
FRANCIS HENRY S. ROSSIRE
BY Roland Plottel
ATTORNEY

INVENTOR.
FRANCIS HENRY S. ROSSIRE
BY
Roland Plottel
ATTORNEY

INVENTOR.
FRANCIS HENRY S. ROSSIRE
BY Roland Plottel
ATTORNEY

United States Patent Office 3,229,511
Patented Jan. 18, 1966

3,229,511
STRESS SENSOR AND CONTROL SYSTEM FOR LIMITING STRESSES APPLIED TO AIRCRAFT
Francis Henry S. Rossire, Salisbury, Conn., assignor to The Bendix Corporation, a corporation of Delaware
Original application June 19, 1961, Ser. No. 118,023. Divided and this application Jan. 31, 1963, Ser. No. 255,389
7 Claims. (Cl. 73—88.5)

The present application is a division of U.S. application Ser. No. 118,023, filed June 19, 1961 by Francis Henry S. Rossire, and assigned to The Bendix Corporation.

The present invention relates to a flexural stress sensor and to a control system operative thereby and method for limiting the control of a craft in response to the applied stress; and more particularly to a device in which flexural stress is measured by means of an instrument that samples a relatively small section of an airfoil surface of an aircraft or other mechanical structure and measures its stress together with means for applying the output of this instrument to a control system of an aircraft so as to limit the control thereof as a function of the stress applied to the airfoil surface of the aircraft to within predetermined safe stress limits.

An object of the present invention is to provide novel means to accurately measure structural stress.

Another object of the invention is to provide a novel device to accurately measure structural stress on parts of an aircraft or other vehicle while in motion, and a measuring device, embodying no moving parts to wear or to be susceptible to vibration, shock, or acceleration.

Another object of the present invention is to construct a flexural stress sensor that will not be permanently damaged when sampling an abnormal deflection as might occur on a wing or other airborne or shipborne member during a hard landing.

Another object of the present invention is to measure flexural stress on members that are not readily accessible.

Another object of the present invention is to enable an aircraft to carry disposable loads, and perform to the maximum allowable under all conditions of loading.

Another object of the present invention is to provide a system that will govern an aircraft flight pattern according to the stresses to which the airplane is subject.

Another object of the present invention is to provide a system that will limit the flight controls of an airplane proportional to the maximum permissible stress that the airplane can withstand.

Another object of the invention is to provide a novel apparatus for sensing structural stress of an aircraft and applying a signal proportional to such stress so as to limit control of the aircraft to predetermined safe stress limits.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

Figure 1:
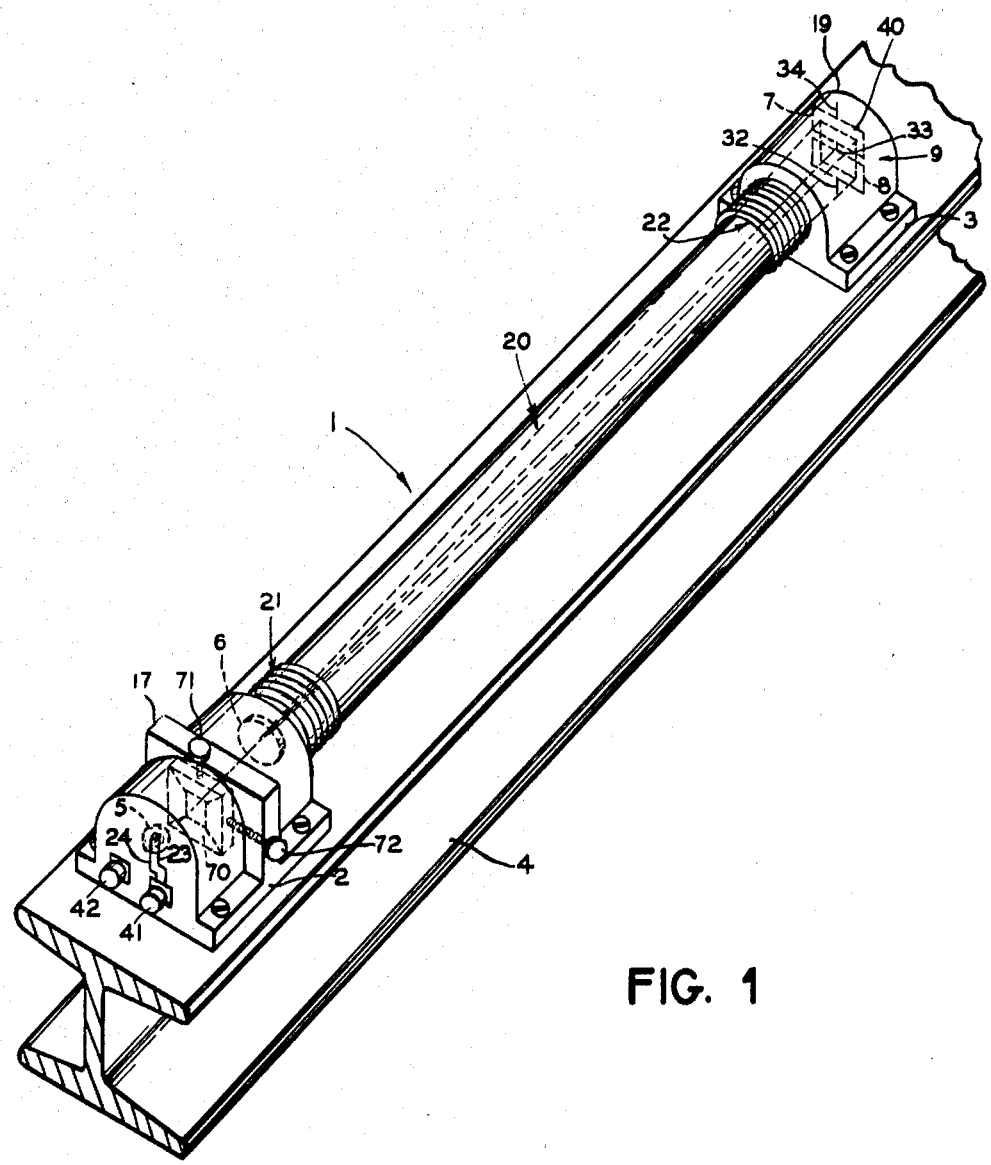
FIGURE 1 is a perspective view of part of the flexural stress sensor mounted on a structural element such as a spar of a wing of an aircraft and showing in dotted lines internal operating parts thereof.

Referring to the drawing of FIGURE 1 there is shown a tubular flexural stress sensor arranged in operative relation to a spar 4 so as to measure stress applied to an airfoil surface such as a wing of an aircraft in which the spar 4 may be mounted. The flexural stress sensor 1 is mounted securely by brackets 2 and 3 along the spar 4. Further mounted at one end of the tubular flexural stress sensor is a light source 5 and lens system 6. An object producing plate 70 is situated between the light source 5 and the lens system 6 to make an image on a photo sensitive component 9, comprising two photo sensitive elements 7 and 8, and located at the other end of the tubular flexural stress sensor 1. The image is to be a rectangular spot of light of dimension slightly less than half of the distance across both photo sensitive elements 7 and 8. There is an adjustment 71 to change the size, and an adjustment 72 to change the location of the image.

The light source 5, plate 70, and lens 6 are enclosed in a tubular connector member 17, closed at one end and securely mounted by the bracket 2 on the wing spar 4. The photo sensitive component 9 is mounted in a second enclosed tubular connector member 19 which is securely attached to the wing spar 4 by bracket 3. A third tubular member 20 is located in between the connector members 17 and 19 and is operatively connected to the members 17 and 19 by flexible corrugated members 21 and 22. Electrical leads 23 and 24 from the electric lamp or light source 5 are connected through a connector 41 of a conventional type to a suitable source of electrical energy, not shown.

Electrical leads 15, 32, and 34 are connected to the photo sensitive elements 7 and 8 which are part of a bridge circuit 18 (not shown in FIGURE 1 but shown schematically in FIGURE 2) located in tubular member 19. Leads 12, 13, 14, and 15 from the bridge circuit are connected to power sources and detectors through connector 42. The entire unit including the tubular members 17, 19, and 20 is sealed and filled with a dry inert gas to eliminate any problem of contamination of the light source or the lens system.

Lens system 6 and plate 70 focuses the light from source 5 on the photo-sensitive component 9. The photo-sensitive component 9 is composed of two photo-sensitive surfaces 7 and 8 aligned perpendicular to the light source, and which change resistance proportional to the amount of light that falls on them. The arrangement of the tubular flexural sensor 1 is such that the corrugated members 21 and 22 permits the connector member 17 to move relative to the tubular member 20 and the connector member 19 to move relative to the tubular member 20 upon flexure of the spar 4 in response to the applied stress, so that the beam of light from the light source 5 falls more on one of the photo-sensitive surfaces 7 or 8 than on the other. Furthermore, the mechanical construction of the photo-sensing unit 9 is such that if the light quantity increases on one surface 7 (or 8), it decreases proportionally on the other 8 (or 7). Therefore, if the resistance of 7 decreases due to an increase of light, the resistance of 8 will increase due to a decrease of light.

Figures 2, 3:
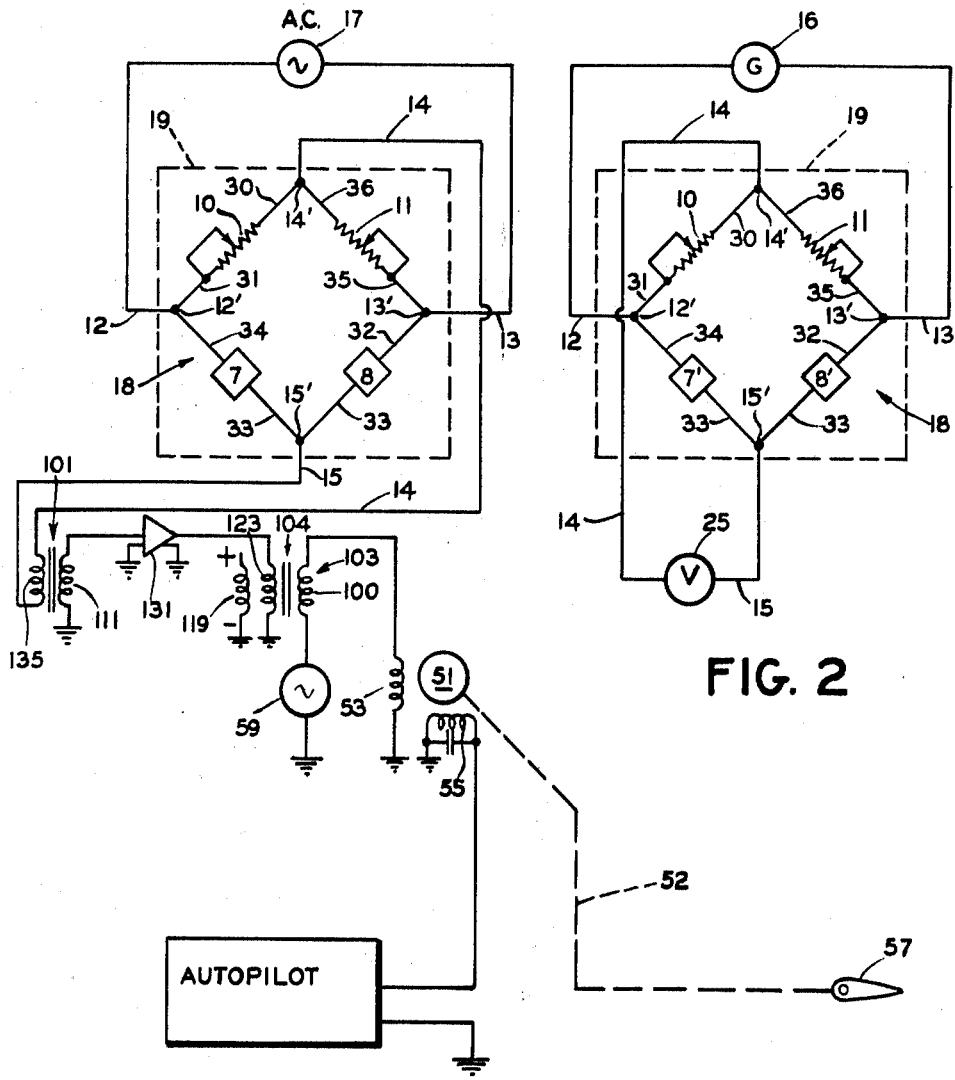
FIGURE 2 is a schematic drawing of the electrical bridge sensing device to be used in the flexural stress sensor.
FIGURE 3 is a schematic drawing of the electrical bridge of FIGURE 2, operatively connected to limit an automatic pilot or other operative means of a control surface of an aircraft to within predetermined safe stress limits.

The two photo-sensitive elements 7 and 8 are part of a bridge network 18, shown in FIGURE 2 in which an electrical potential is applied from a suitable source of voltage excitation 16 through leads 12 and 13 to two opposite points 12' and 13' of the bridge 18. Two adjustable resistors 10 and 11 are placed in the remaining two adjacent arms of the bridge 18 and are connected together by conductors 30 and 36 meeting at point 14', and in turn connected to point 12' through conductor 31 and to point 13' through conductor 35. A detector 25 with two leads 14 and 15 is connected to points 14' and 15' of the bridge. When equal amounts of light fall on 7 and 8, and the resistance of 10 is initially adjusted to equal that of 7', and the resistance of 11 is initially adjusted to equal that of 8', the bridge is balanced and there is no voltage resultant across the detector 25. As the beam deflects, the quantities of light falling on photo-sensitive elements 7 and 8 vary, and the resistances of the elements 7 and 8 vary, thereby causing a signal to appear across the points 14' and 15'. The detector 25 as shown here is a volt meter, however, it may be a frequency meter, or any other suitable detector that will record the electrical differences across points 14' and 15'. The reading on the meter is proportional to the flexure of the beam which is related to stress. The scale on the meter may be calibrated in volts, or units of deflection, or stress.

Moreover, as may be seen, the length of the stress sensor 1 and the distance between the light source 5, plate 70, and lens 6 and the photo-sensitive element 9 may depend upon its application and the range of measurement.

Furthermore, through the novel arrangement of the tubular stress sensor 1 with illuminating lamp 5 and the photo-sensitive elements 9, there are no moving parts to wear or to be susceptible to vibration, shock, or acceleration. Also, any stress such as, shipboard, or hard landings that might deflect the wing section beyond the limits of the wing stress sensor, will cause no structural damage to the tubular stress sensor nor any permanent calibration error.

Figure 4:
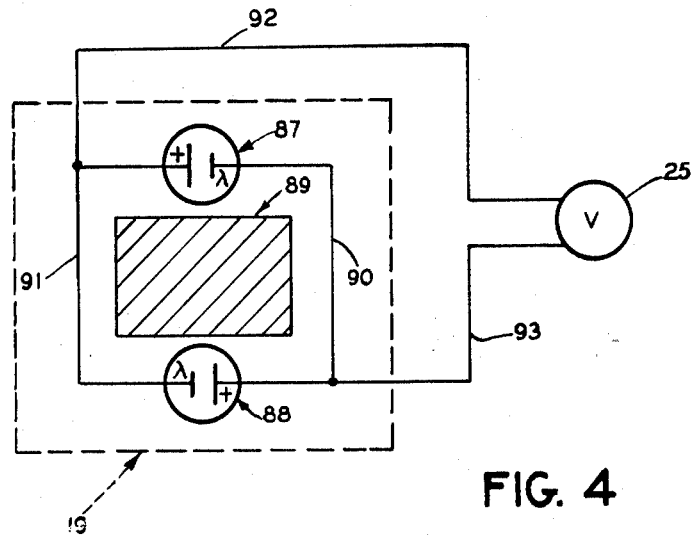
FIGURE 4 is a schematic drawing of an alternative electrical sensing device to be used in the flexural stress sensor of FIGURE 1.

As an alternative embodiment, the photo-sensitive component 9 as shown in FIGURE 4, may consist of two photovoltaic cells 87 and 88 connected together by conductors 90 and 91 so that the positive of one cell is connected to the negative of the other cell. A detector 25, shown here as a volt meter, is connected by conductors 92 and 93 to conductors 91 and 90. When the spar 4 is unflexed, the image of light 89 (from the light source 5, focusing system 70, and lens system 6) is focused in between the two cells 87 and 88. As the spar 4 is flexed, the light image 89 moves with respect to the photovoltaic cells 87 and 88, and as the light beam falls on either cell 87 or 88, a current is generated therein which is recorded on the meter 25. It should be noted that the meter 25 will indicate first the magnitude of the current from the cell which is proportional to the amount of flexure, and second, the direction of the current which is determined by the direction of flexure (viz: whether the light image 89 falls on one cell or the other).

FLIGHT CONTROL LIMITER

As an alternate application of the invention, in addition to measuring the actual deflection or stress in a member, the apparatus may be used as a governor of undesirable maneuvers during flight of the aircraft. For example, exceptionally tight turns, pull outs, and nose overs, etc. could cause fatal structural damage and/or incapacitation of the pilot and crew. To avoid such maneuvers and attendant difficulties, the flexural stress sensor may be operatively connected to the flight controls so as to monitor the stress applicable to the aircraft structure. As the applied stress exceeds a predetermined safe range, a control surface of the aircraft, for example, an elevator surface of the aircraft may be so controlled through operation of the stress sensor 1 as to limit the steepness of the maneuvers.

In the latter form of the invention, the flexural stress sensor may be attached to a wing spar 4 of the aircraft, as described above with reference to FIGURE 1. Moreover, the detector 25 of FIGURE 2 may be removed and the bridge output 14'–15', as shown in FIGURE 3, operatively connected in a control system for limiting the output of a servo motor for positioning an elevator surface normally controlled by an automatic pilot. The control system may be of a type such as described and claimed in a copending U.S. application Serial No. 697,053, filed November 18, 1957, by Marvin Masel and Harold Moreines and assigned to The Bendix Corporation, now U.S. Patent No. 3,008,078. Further, a suitable source of alternating current 17 is connected across the bridge 18 of FIGURE 3.

Furthermore, in the operative arrangement of FIGURE 3, a two phase motor 51 is drivably connected to a control surface, for example, elevator surface 57 of an aircraft by a linkage 52. Automatic pilot command signals and follow-up are connected to variable phase winding 55 of motor 51 for controlling speed and direction of rotation of the motor. Fixed phase winding 53 is connected to a source of alternating current 59 by a series connected variable impedance winding 100. The voltage across fixed phase winding 53 is constant when the spar 4 of the craft is not subjected to stress and the motor torque is controlled solely by the automatic pilot command signals and follow-up applied to the variable phase winding 55.

Flexural stress sensor 1 will, however, vary the voltage in fixed phase winding 53 whenever the spar 4 and airfoil surface or wing of the aircraft is subject to abnormal stress. The output of flexural stress sensor 1 is fed into an inductive device 101 having a primary winding 135, which is connected across the bridge at 14'–15'. The output of the bridge induces an alternating current in a secondary winding 111. The induced current is amplified and rectified by an amplifier rectifier 131 and then applied to a primary winding 123 on a core 104 of a saturable reactor 103. Core 104 of reactor 103 is biased to saturation by a biased winding 119 and the rectified current in primary 123 opposes the saturating effect of the current in winding 119 so that the core 104 becomes less magnetized and increases the impedance of secondary winding 100 of reactor 103. As the wing spar 4 is stressed, the bridge becomes unbalanced, resulting in an increased current in the secondary winding 111 and an increase in the impedance of winding 100.

As the impedance of winding 100 increases, the voltage across motor fixed phase winding 53 decreases to that the maximum motor torque decreases accordingly since the maximum motor torque is approximately proportional to the production of the voltage available across the motor windings 53 and 55.

The resulting decrease in the torque applied by the motor 51 to the elevator 57 will then permit the areodynamic forces applied to the control surface 57 to effect a readjustment thereof in a sense to reduce the stress applied to the wing spar 4 and airfoil surface to predetermined safe limits.

Thus the control device described provides an effective and reliable means for limiting the maneuver of an airplane as a function of the actual stress applied on its members by changing the voltage applied to the fixed phase winding of the control surface actuating motor and thereby limiting the authority of a commond signal applied to the actuating motor.

Figure 5:
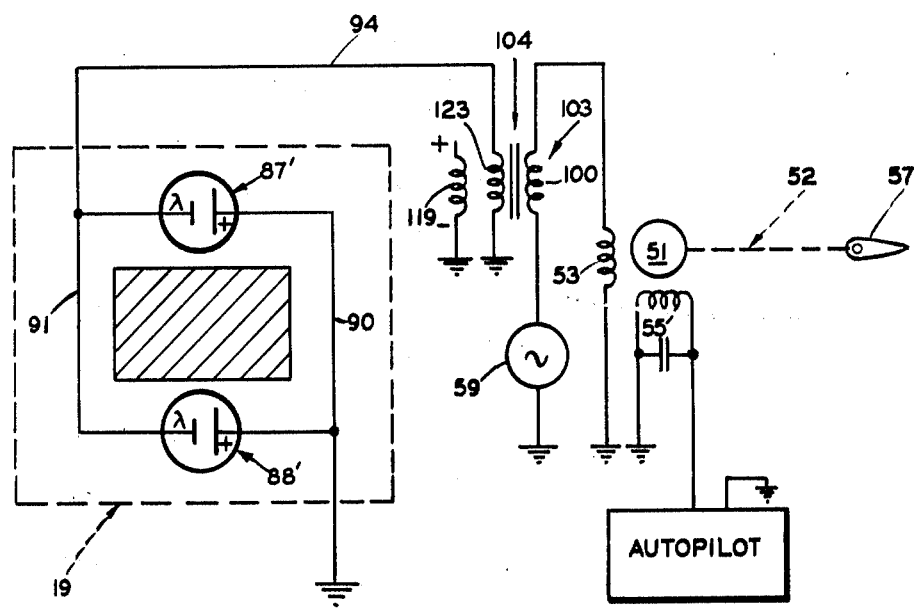
FIGURE 5 is a schematic drawing of the alternative electrical sensing device of FIGURE 4, operatively connected to limit an automatic pilot or other operative means of a control surface of an aircraft to within predetermined safe stress limits.

An alternative embodiment of the flight control limiter is shown in FIGURE 5 which resembles flight control limiter circuit of FIGURE 3. The difference herein consists of replacing the two photo conductive elements 7 and 8 and attendant bridge circuit 18 of FIGURE 3 by the photovoltaic cells 87' and 88' connected together by conductors 90 and 91, as shown in FIGURE 5. It being noted, however, that the photovoltaic cells 87' and 88' are connected with their negative sides connected to conductor 91 and their positive sides connected through conductor 90 to ground. The light image 89 from the lens source focusing plate 70, and lens 6 falls in between the two photovoltaic cells 87' and 88' for the unflexed position. The output of the two cells is connected to a control system of the type shown in FIGURE 3. As the airfoil surface 4 on which the flexural stress sensor is mounted is flexed, the beam of light 89 will fall on either of the photovoltaic cells 87' or 88' thereby producing a controlling current which flows through conductor 94 into coil 123 of the saturated reactor 104 so that the operation of this alternative embodiment with respect to the control system for motor 51 is substantially the same as explained above in the description accompanying FIGURE 3 and need not be repeated here.

While several embodiment of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A flexural stress sensor for measuring the stress of an elongated structural member on which the sensor may be effectively mounted, comprising a light source and lens system rigidly mounted to one portion of the elongated structural member, and two photo sensitive elements rigidly mounted at another portion on the structural member longitudinally spaced from the one portion and in such proximity to the light source and lens that a beam of light from the source will substantially perpendicularly on both photo sensitive elements when the member is unflexed; a normally balanced electrical bridge, two legs of which contain the photo sensitive elements, the remaining legs having suitable impedances to electrically balance the bridge when the beam is in an unflexed position; a detecting device operatively connected to the bridge and including a stress indicating means, the light source, lens system, and photo sensitive elements being so mounted in said longitudinal spaced relation on the elongated structural member that deflection thereof in one direction will cause the photo sensitive elements to move perpendicular to the light source in said one direction to cause light falling on one photo sensitive element to increase and on the other photosensitive element to decrease thereby unbalancing the bridge to effect operation of the detector causing the indicator means of the detector to indicate a differential amplitude and phase variation in stress signals proportional to the deflection of said elongated structural member.

2. The flexural stress sensor as defined by claim 1 including a hermetically sealed flexible housing filled with an inert gas to enclose the light source, lens system, and photo sensitive elements and the space between them thereby keeping these elements free from contamination and corrosion.

3. A sensor for measuring displacement of an elongated member from a normal position upon application of a stress to said member, the sensor comprising a light source and lens system rigidly attached to one portion on the member; two photo sensitive elements rigidly attached to another portion on said member in longitudinal spaced relation to said light source and lens system, the light source and lens system being in such proximity to the photo sensitive elements that light from the source will normally fall in equal amounts and substantially perpendicularly on both photo sensitive elements; a bridge, two legs of said bridge including each of said two photo sensitive elements, the other two legs of the bridge including suitable impedances to balance the bridge upon the member being in said normal position; and upon stress being applied to said member in one direction for displacement of said member in said one direction from the normal position, the light falling on one photo sensitive element is increased and the light falling on the other photo sensitive element is decreased so as to unbalance the bridge in one sense and effect an output signal of a different amplitude and phase variation as a function of the stress applied to said member in said one direction.

4. The sensor as defined by claim 3 including a hermetically sealed flexible housing filled with inert gas to enclose the light source, lens system, and photo sensitive elements and the space between them thereby keeping these elements free from contamination and corrosion.

5. A sensor for measuring small displacements of one portion of an elongated member from a normal position relative to another portion of said member, said sensor comprising a light source and lens system rigidly attached to said one portion; two photo sensitive elements rigidly attached to the other portion and in longitudinal spaced relation to said light source and lens system, so that light from the source will in a normal position fall in equal amounts and substantially perpendicularly on both photo sensitive elements; a bridge, two legs of which include each of said two photo sensitive elements, the other two legs of the bridge including suitable impedances to balance the bridge upon the two portions being in normal position; and upon the displacement of said one portion from the normal position relative to the other portion and in a plane perpendicular to the light rays said displacement thereby causing an increasing amount of light to fall on one photo sensitive element and a decreasing amount of light to fall on the other photo sensitive element so as to unbalance the bridge and effect a differential output signal as a function of the displacement of one portion relative to the other depending upon the magnitude and the direction of the displacement.

6. In a system for measuring stresses on an elongated wing spar of an airborne craft, the combination comprising a sensor mounted on the spar, said sensor including a light source and focusing system; two photo sensitive elements mounted on the spar in longitudinal spaced relation to the light source and focusing system and in the path of the focused light rays with faces of the two photo sensitive elements being in a plane substantially perpendicular to the light rays; and an electrical sensing means connected to the photo sensitive elements operable for detecting in amplitude and phase the displacement of said two photo sensitive elements in one direction relative to said light source and focusing system as the photo sensitive elements move perpendicular to the light rays whereby due to displacement thereof relative to the light source, a differential effect is produced as light will fall more on one photo sensitive element than on the other, thus changing the electrical characteristics of each photo sensitive element so as to differently effect in amplitude and phase the operation of the electrical sensing means.

7. A sensor for measuring small displacements of one portion of an elongated member from a normal position relative to another portion of said member, said sensor comprising a light source and lens focussing system rigidly attached to said one portion; photo sensitive elements rigidly attached to another portion and in longitudinal spaced relation to said light source and lens focusing system so that a beam of light from the source will fall substantially perpendicularly to the plane of the face of the photo sensitive element; and upon the displacement of said one portion from the normal position relative to the other portion and in the plane perpendicular to the beam of light the displacement causing an increasing amount of light to fall on one photo sensitive element and a decreasing amount of light to fall on the other photo sensitive element so as to produce a current in the photo sensitive element and effect an output signal in amplitude and phase as a function of the magnitude and directional displacement of the one portion relative to the other.

References Cited by the Examiner

UNITED STATES PATENTS

| | | | |
|---|---|---|---|
| 1,827,520 | 10/1931 | Harrison | 73—382 |
| 2,599,975 | 6/1952 | Carpenter | 73—194 |
| 3,077,139 | 2/1963 | Todd et al. | 88—14 |
| 3,141,419 | 7/1964 | Clayborne et al. | 88—14 X |

FOREIGN PATENTS 178,186   12/1905   Germany.

RICHARD C. QUEISSER, *Primary Examiner.*